US008326037B1

(12) United States Patent
Abitz et al.

(10) Patent No.: US 8,326,037 B1
(45) Date of Patent: Dec. 4, 2012

(54) METHODS AND APPARATUS FOR LOCATING AN OBJECT IN AN IMAGE

(75) Inventors: Jon Abitz, Montreal (CA); Djamel Meddah, Saint Laurent (CA); Christian Simon, Laval (CA)

(73) Assignee: Matrox Electronic Systems, Ltd., Dorval (CA)

( * ) Notice: Subject to any disclaimer, the term of this patent is extended or adjusted under 35 U.S.C. 154(b) by 1022 days.

(21) Appl. No.: 11/286,710

(22) Filed: Nov. 23, 2005

(51) Int. Cl.
*G06K 9/00* (2006.01)
*G06K 9/18* (2006.01)
*G06K 9/46* (2006.01)
*G06K 9/66* (2006.01)
*G06K 7/10* (2006.01)

(52) U.S. Cl. ........ 382/181; 382/100; 382/101; 382/182; 382/194; 235/462.01

(58) Field of Classification Search . 235/462.01–462.49
See application file for complete search history.

(56) References Cited

U.S. PATENT DOCUMENTS

| | | | |
|---|---|---|---|
| 5,153,928 A * | 10/1992 | Iizuka | 382/321 |
| 5,155,343 A * | 10/1992 | Chandler et al. | 235/462.09 |
| 5,303,313 A | 4/1994 | Mark et al. | |
| 5,357,093 A | 10/1994 | Netter et al. | |
| 5,832,138 A | 11/1998 | Nakanishi et al. | |
| 5,937,077 A | 8/1999 | Chan et al. | |
| 6,263,089 B1 | 7/2001 | Otsuka et al. | |
| 6,285,775 B1 | 9/2001 | Wu et al. | |
| 6,886,107 B2 | 4/2005 | Walsh et al. | |
| 7,237,721 B2 * | 7/2007 | Bilcu et al. | 235/454 |
| 2002/0099972 A1 | 7/2002 | Walsh et al. | |
| 2002/0165843 A1 | 11/2002 | Takahashi | |
| 2002/0186875 A1 | 12/2002 | Burmer et al. | |

(Continued)

FOREIGN PATENT DOCUMENTS

EP 01450303 A2 8/2004

(Continued)

OTHER PUBLICATIONS

Blaskó, G. et al., "Real-Time 3D Object Recognition for Automatic Tracker Initialization", Proceedings of the IEEE and ACM International Symposium on Augmented Reality, pp. 175-176, 2001.

(Continued)

*Primary Examiner* — Anand Bhatnagar
*Assistant Examiner* — Nathan Bloom
(74) *Attorney, Agent, or Firm* — Rhodes Donahoe, P.C.

(57) ABSTRACT

A method for locating an object in an image is provided for an object that exhibits, in at least one direction, foreground pixel runs and background pixel runs consistent with at least characteristic of the object. In one embodiment, the method includes the acts of defining a plurality of regions in the image, associating a metric with each of the regions, finding pixel runs in the image, and identifying at least one pixel run in one of the plurality of regions where the at least one pixel run is consistent with the at least one characteristic of the object. According to one embodiment, the method includes the acts of adjusting the metric associated with the region where the at least one pixel run is identified and identifying, from among the plurality of regions, a region where the object is located based on a metric determined for a plurality of regions. In various embodiments, the object includes a repetitive pattern such as those found in barcodes and character strings.

19 Claims, 8 Drawing Sheets

U.S. PATENT DOCUMENTS

| | | |
|---|---|---|
| 2003/0141980 A1 | 7/2003 | Moore et al. |
| 2003/0236832 A1 | 12/2003 | McIntyre et al. |
| 2004/0064269 A1 | 4/2004 | Shibuya et al. |
| 2004/0161141 A1 | 8/2004 | Dewaele |
| 2004/0268341 A1 | 12/2004 | Kenworthy |
| 2005/0149741 A1 | 7/2005 | Humbel |
| 2005/0218224 A1 | 10/2005 | Boldin |

FOREIGN PATENT DOCUMENTS

| | | | |
|---|---|---|---|
| JP | 04193699 | A | 7/1992 |
| WO | 8703398 | A1 | 6/1987 |
| WO | 8910249 | A1 | 11/1989 |
| WO | 8911257 | A1 | 11/1989 |
| WO | 9007842 | A2 | 7/1990 |
| WO | 9008359 | A1 | 7/1990 |
| WO | 9202892 | A1 | 2/1992 |
| WO | 9312610 | A1 | 6/1993 |
| WO | 9322869 | A1 | 11/1993 |
| WO | 9426162 | A1 | 11/1994 |
| WO | 9510813 | A1 | 4/1995 |
| WO | 9606490 | A1 | 2/1996 |
| WO | 9608925 | A1 | 3/1996 |
| WO | 9637996 | A1 | 11/1996 |
| WO | 9852189 | A2 | 11/1998 |
| WO | 9855945 | A1 | 12/1998 |
| WO | 0157819 | A2 | 8/2001 |
| WO | 02097714 | A1 | 12/2002 |
| WO | 03060837 | A1 | 7/2003 |
| WO | 2004038632 | A1 | 5/2004 |
| WO | 2005053309 | A1 | 6/2005 |
| WO | 2005091182 | A2 | 9/2005 |

OTHER PUBLICATIONS

Burns, J.B. et al, "Recognition Via Blob Representation and Relational Voting", Conference Record of the Twenty-Seventh Asilomar Conference on Signals, Systems and Computers, vol. 1, pp. 101-105, 1993.

Fayman, J.A. et al., "Exploiting Process Integration and Composition in the Context of Active Vision", IEEE Transactions on Systems, Man, and Cybernetics—Part C: Applications and Reviews, vol. 29, No. 1, pp. 73-86, Feb. 1999.

Forssén, E. et al, "View Matching with Blob Features", Proceedings of the Second Canadian Conference on Computer and Robot Vision (CRV '05), IEEE, pp. 228-235, 2005.

Goldberg, K. et al., "Collaborative Teleoperation Using Networked Spatial Dynamic Voting", Proceedings of the IEEE, vol. 91, No. 3, Mar. 2003, pp. 430-439.

Hashim, R., et al., "Recognizing Shapes Via Random Chord Samplings", Proceedings CVPR '86: IEEE Computer Society Conference on Computer Vision and Pattern Recognition, pp. 637-639, 1986.

Javed, O. et al., "KNIGHTTM: A Real Time Surveillance System for Multiple Overlapping and Non-Overlapping Cameras", Proceedings 2003 International Conference on Multimedia and Expo., vol. 1, pp. 649-652.

Kawaguchi, T. et al., "Detection of Eyes from Human Faces by Hough Transform and Separability Filter",, Electronics and Communications in Japan, Part 2, vol. 88, No. 5, 2005, pp. 29-39.

Kimura, A. et al., Fast Generalized Hough Transform-Rotation, Scale and Translation Invariant Detection of Arbitrary Shapes:, Transactions of the Institute of Electronics, Information and Communication Engineers D-II, vol. J81D-II, No. 4, Apr. 1998, pp. 726-734.

Peng, H. et al., "Comparing In Situ mRNA Expression Patters of *Drosophila* Embryos", Proceedings of the Annual International Conference on Computational Molecular Biology, RECOMB, vol. 8, pp. 157-166, RECOM '04, Mar. 27-31, San Diego, CA.

Vaughn, D. L. et al., "Workstation Recognition Using A Constrained Edge-Based Hough Transform For Mobile Robot Navigation", SPIE Sensor Fusion III: 3-D Perception and Recognition, vol. 1383, pp. 503-514, 1990.

Wesolkowski, S. et al., "A Comparative Study of Combination Schemes for an Ensemble of Digit Recognition Neural Networks", 1997 IEEE International Conference on Systems, Man, and Cybernetics, vol. 4, pp. 3534-3539.

Yang, Q. et al., "Perceptual Organization of Radial Symmetries", Proceedings of the 2004 IEEE Computer Society Conference on Computer Vision and Pattern Recognition, vol. 1, pp. 320-325, 2004.

Yang, Q., et al., "Localization of Saliency Through Iterative Voting", Proceedings of the 17th International Conference on Pattern Recognition, vol. 1, pp. 63-66, 2004.

Borchani, M. et al., "Texture Based Image Retrieval by Combining Multiple Tools," Proceedings of 2000 International Conference on Imaging Science, Systems, and Technology, CISST '00 International Conference, pp. 659-664, Jun. 26-29, 2000.

\* cited by examiner

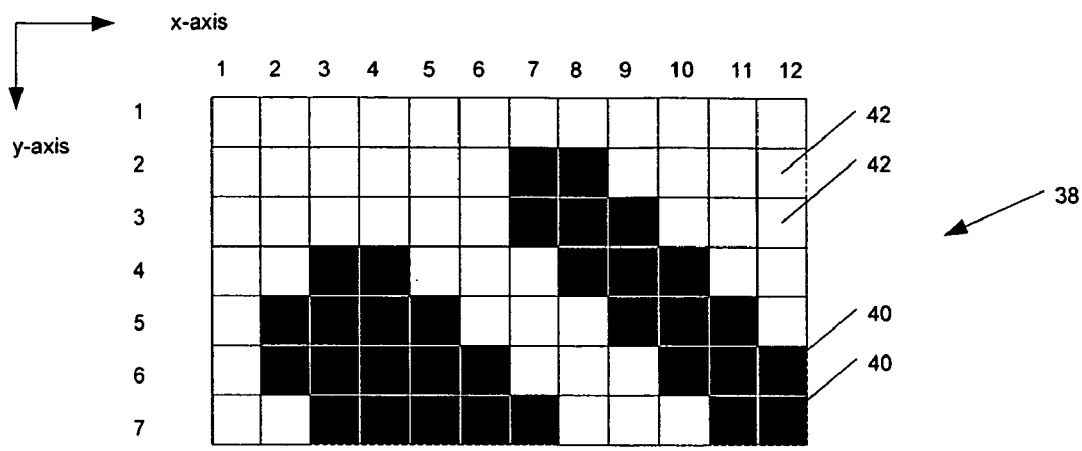
Fig. 5
Fig. 6
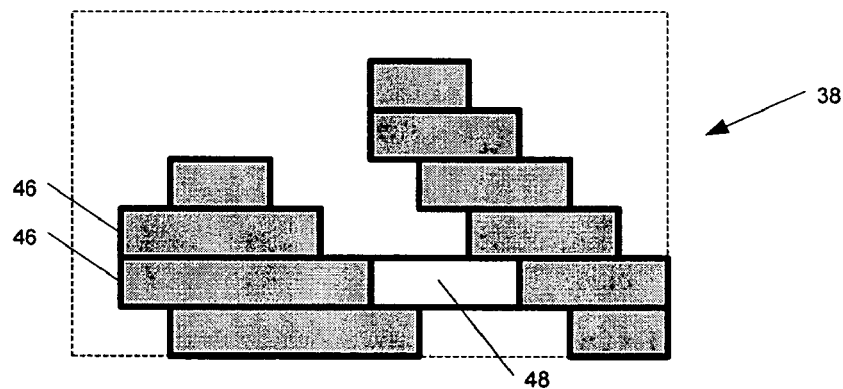
Fig. 7
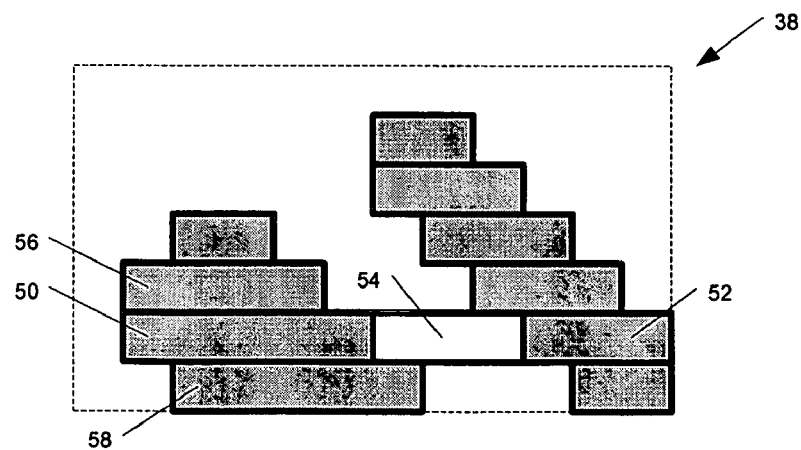

METHODS AND APPARATUS FOR LOCATING AN OBJECT IN AN IMAGE

BACKGROUND OF INVENTION

1. Field of Invention

At least one embodiment of the invention relates to image processing, in particular, to locating an object in an image.

2. Discussion of Related Art

Image processing is employed in a wide variety of applications in which a system such as a machine vision system processes an image that has been scanned or otherwise been captured in a digital format. The images that are processed may be captured by a camera including a video camera. At least in part as a result of improved digital imaging technology (i.e., digital cameras, etc.), there is an increased reliance on methods for processing images to obtain information that can be used with automated systems. Material handling systems provide one such example.

Often, image processing involves locating one or more objects within the image. Examples include locating the barcode in an image of an item and locating a character string in an image of an item. Once the object is located, the system may then interpret the information provide by the object or otherwise further process the image based on the information. For example, where optical character recognition ("OCR") is employed, character strings located in an image may be interpreted (e.g., read) after they are located. Where the object is a barcode, the barcode data can be interpreted once the barcode is located.

One known approach to locating objects with repetitive patterns such as barcodes and character strings includes finding aligned regions having similar sizes and intensity, sometimes referred to as "blobs." However, these approaches are ineffective where separate elements or separate characters, respectively, each touch another object because the blob includes the separate elements within it and the separate elements may not be located using current approaches.

Thus, current approaches are not robust enough to locate objects with repetitive patterns without being provided with an exact description of the object and knowledge of the object's size and orientation. Current approaches are particularly ineffective when the object being searched for is touching another object in the image.

SUMMARY OF INVENTION

In at least one embodiment of the invention, a process is employed to locate an object with a repetitive pattern such as a barcode or a character string in an image by evaluating the features of pixel runs of a binarized version of the image.

One aspect includes a method for locating a barcode in an image where the barcode has at least one characteristic. The method includes the acts of defining a plurality of regions in the image, associating a vote accumulator with each of the plurality of regions, finding pixel runs in the image, and identifying at least one pixel run in one of the plurality of regions where the pixel run is consistent with the at least one characteristic. In one embodiment, the method also includes the acts of adjusting the vote accumulator associated with the region where the at least one pixel run is identified and identifying, from among the plurality of regions, a region where the barcode is located based on the vote accumulator.

Another aspect includes a method for locating a character string in an image where the character string has at least one characteristic. The method includes the acts of defining a plurality of regions in the image, associating a vote accumulator with each of the plurality of regions, finding pixel runs in the image, and identifying at least one pixel run in one of the plurality of regions where the pixel run is consistent with the at least one characteristic. In one embodiment, the method also includes the acts of adjusting the vote accumulator associated with the region where the at least one pixel run is identified and identifying, from among the plurality of regions, a region where the character string is located based on the vote accumulator.

Yet another aspect provides a method for locating an object in an image where the object exhibits in at least one direction foreground pixel runs and background pixel runs consistent with at least one characteristic of the object. In one embodiment, the method includes the acts of defining a plurality of regions in the image, associating a metric with each of the regions, finding pixel runs in the image, and identifying at least one pixel run in one of the plurality of regions where the at least one pixel run is consistent with the at least one characteristic of the object. According to one embodiment, the method includes the acts of adjusting the metric associated with the region where the at least one pixel run is identified and identifying, from among the plurality of regions, a region where the object is located based on a metric determined for a plurality of regions.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 5 illustrates pixels in a region according to an embodiment of the invention;

FIG. 6 illustrates pixel runs identified in the region shown in FIG. 5 according to an embodiment of the invention;

FIG. 7 illustrates pixel runs identified in the region shown in FIG. 5 according to another embodiment of the invention;

DETAILED DESCRIPTION

Figure 1:
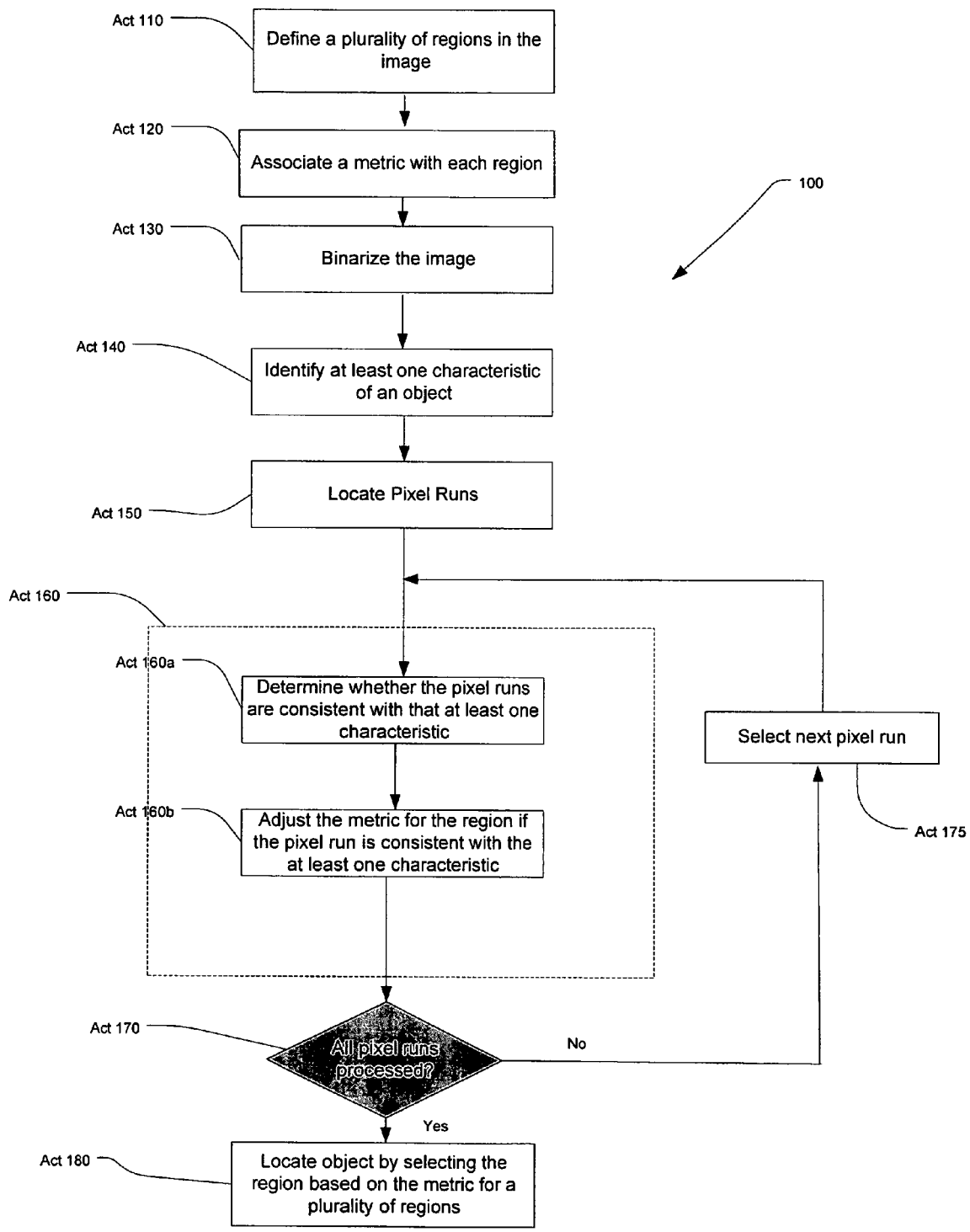
FIG. 1 illustrates a flow diagram of a process for locating an object in an image in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

According to one embodiment, object localization within an image is performed by evaluating data corresponding to a binary image. In general, an image such as a digital picture or video may be converted to a binary image by a process sometimes referred to as binarization. A variety of images may be binarized, for example, color images and grayscale images. In addition, analog images that are converted to a digital format may also be binarized.

Various techniques may be used to binarize in image. For example, various thresholding techniques known in the art may be employed such as adaptive thresholding and local adaptive thresholding. Thresholding techniques are employed to distinguish pixels included in objects within the image, which may be referred to as foreground pixels, from pixels included in the background even where an image includes regions of varying illumination (e.g., shadows). According to one embodiment, a threshold corresponding to an intensity level is calculated for each pixel that comprises the image. The threshold may be selected based on the intensity of neighboring pixels. In a version of this embodiment, each pixel that is above the threshold is set to a first binary value (e.g., it is included in the foreground) and each pixel that is below the threshold is set to a second binary value (e.g., it is include in the background). In some applications where the image includes a relatively uniform degree of illumination, global thresholding techniques may be employed.

In one embodiment, the result of binarization is an image that consists of plurality of pixels each having either the first binary value or the second binary value.

Figure 2:
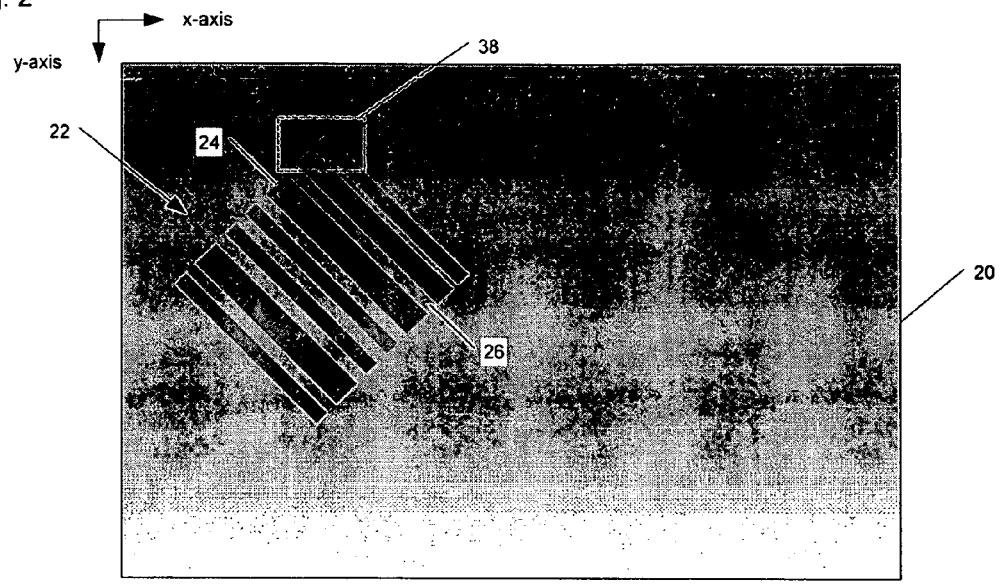
FIG. 2 illustrates an image in accordance with one embodiment of the invention.

Referring to FIG. 2, the binarization of an image 20 results in the generation of a plurality of pixels corresponding to locations in the image 20. FIG. 2, illustrates the image 20 (e.g., a grayscale image) including an object 22 which includes alternating contrasting regions 24, 26 where, in one embodiment, the object 22 is a barcode, the region 24 is a bar in the barcode and the region 26 is a gap in the barcode. A region 38 can also be identified in the image 20 and is referred to here for the purpose of explanation.

FIG. 5 illustrates a view of the pixels included in the region 38 after the image 20 is binarized. The region 38 can include a plurality of pixels that, in one embodiment, are organized linearly within the region. In the embodiment illustrated in FIG. 5, the region 38 is separated into a grid of pixels indexed by row and column such that each pixel can be uniquely located based on the row number and column number of the row and column, respectively, in which it is located.

In FIG. 5, each of the pixels 40 have a first binary value and each of the pixels 42 have a second binary value. As mentioned above, the two binary values may be referred to as a value associated with a "foreground" and a value associated with a "background," respectively, within the image where foreground pixels are above the threshold and background pixels are below the threshold. In one embodiment, the object 22 can include pixels having the binary value associated with the foreground and pixels having the binary value associated with the background.

Generally, every object exhibits one or more characteristics that result in a detectable arrangement of pixels that may assist in locating the object in the binarized image. For example, an object may include characteristics such as a shape, a ratio of length to width, a repetitive pattern, and/or a particular association between a plurality of elements included in the object. That is, according to one embodiment, an object may be identified by analyzing the pixel arrangement in a binarized image. More specifically, the binarized image may be analysed for the occurrence of pixel runs.

A pixel run is a group of adjacent pixels having the same binary value. Referring again to FIG. 5, row 3 of the region 38 includes a pixel run that includes the pixels 3-7, 3-8, 3-9 each having the first binary value, e.g., a foreground pixel run.

Pixel runs for those pixels having the second binary value may also be located, for example, row 4 includes a pixel run that includes the pixels 4-11, 4-12 each having the second binary value, e.g., a background pixel run. The quantity of pixels forming the run is known as the "run length" of the run. Thus, the pixel run including pixels 3-7, 3-8, 3-9 has a run length of three and the pixel run including the pixels 4-11, 4-12 has a run length of two. Because by implication, a pixel of a second binary value exists wherever a pixel with the first binary value is not located, in one embodiment, pixel runs including pixels having the second binary value may be located when pixels having the first binary value are identified.

In one embodiment, a pixel run is any group of one or more adjacent pixels with the same binary value that are arranged linearly within the region 38. Further, according to one embodiment, pixel runs include adjacent pixels with the same binary value that are arranged linearly within the same row. That is, in some embodiments, a group of adjacent pixels with the same binary value that are arranged linearly in a column are not considered a pixel run.

In general, characteristics of the object may be located at a pixel-run level because, for example, the object may exhibit one or more known characteristics that may be detectable by analyzing pixel runs. That is, a pixel run may include one or more features such as a length of a pixel run, an association between a first pixel run and one or more additional pixel runs located in the same row, an association between a first pixel run and adjacent pixel runs in one or more adjacent rows, and the like where the features of the pixel runs correspond to characteristics of the object, e.g., correspond to the features of a binarized version of the object.

In the context of a barcode system, for example, the maximum width of a bar and the minimum width of a bar may correspond to the maximum width of a pixel run and the minimum width of the pixel run. Further, the barcode system may include gaps between the bars where the gaps also include a maximum width and a minimum width. In the context of character strings, the width of characters and the width of a space between characters may each also have maximum and minimum widths that correspond to the width of maximum and minimum foreground and background pixel to runs, respectively, corresponding to the character string. As is described in greater detail below, any of the preceding features of barcodes and character strings may be employed alone or in combination with these and other features when analyzing an image to determine the location of the barcode or character string, respectively.

According to one embodiment, the pixel-run analyses of a plurality of regions (e.g., the region 38) included in the image 20 are evaluated to determine where the object 22 is located within the image. Further, according to one embodiment, the pixel-run analyses of each of the plurality of regions included in the image 20 are evaluated to determine where the object 22 is located with the image 20.

Figure 3:
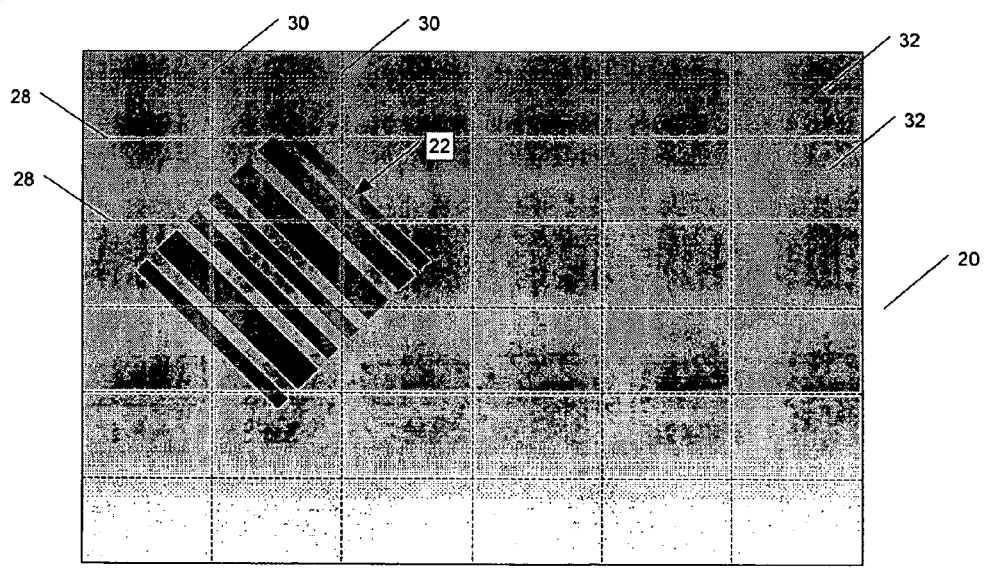
FIG. 3 illustrates a plurality of regions identified within the image of FIG. 2 according to an embodiment of the invention.
Figure 4:
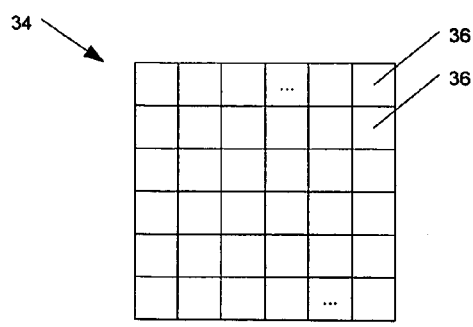
FIG. 4 illustrates a voting array associated with the regions of FIG. 3 according to an embodiment of the invention.

Referring now to FIGS. 3 and 4, according to one embodiment, a plurality of regions 32 are defined in the image 20, a vote accumulator array 34 is associated with the image 20 and an element 36 of the vote accumulator array 34 is associated with each of the plurality of regions 32. According to one embodiment, the region 38 corresponds to one of the regions 32 and to an element 36 of the vote accumulator array 34. The vote accumulator array 34 provides a data set using at least one metric (e.g., a score) for each of the plurality of regions where the metric allows the regions to be evaluated for the likelihood that a particular region is the location of the object 22. According to one embodiment, each element of the vote array accumulates votes for the region with which it is associated.

In one embodiment, the plurality of regions 32 for which the vote accumulator array 34 is associated does not include every region in the image. For example, image processing completed before the generation of the vote accumulator array 34 may identify a general area within the image where the object is most likely located and the vote accumulator array 34 may have elements for only those regions included in the previously identified general area. That is, the localization of the object is focused within an area including only some of the regions 32 of the image 20.

The vote accumulator 34 may be any algorithm or system that generates a metric corresponding to the pixel-run information for a plurality of regions. In particular, for each region associated with an element 36 of the vote accumulator array 34, the vote accumulator generates a metric corresponding to pixel runs included in the region that are consistent with at least one characteristic of the object being located. According to one embodiment, when the desired metric or metrics are completed for each region associated with the vote accumulator array 34, the region 32 where the object is located is identified by selecting the region corresponding to the element 36 of the array that has the highest score (e.g., vote count). Other approaches are possible in various embodiments of the invention. For example, in one embodiment, the vote accumulator array 34 employs a decrementing scoring system where a low score indicates a high probability that the object 22 is located in the region 32 and the object is located by selecting the region corresponding to the element 36 of the array that has the lowest score.

The size of the regions can be selected to optimize the difference between regions with a high probability that they include the object and regions with a low probability that they include the object. That is, the size of the regions 32 may be selected to aid the object localization by providing meaningful differences in the value of the metric associated with regions where the object is located and the value of the metric associated with regions where the object is not found. For example, if the size of the regions is too large, the distinctions between the value of the metrics for the "high-probability" and the "low-probability" regions may be lost because both types of regions will include large areas of both foreground pixels and background pixels. As a result, when a comparison of the totals of the vote accumulator array 34 are performed, the region where the object is located will not have a value associated with it (i.e., in the element of the vote accumulator array 34) that indicates that the object is in the region, in particular, it will not have such a value when compared with other regions.

In an embodiment where the object 22 is a barcode, the width of a region may be about half the width of the barcode and the height of the region may be about half the height of the barcode. The dimensions of the regions may be selected based on the dimensions of the image 20 and the estimated dimensions of the barcode determined using, for example, a minimum and a maximum nominal bar width.

Referring to FIG. 1, an embodiment of a process 100 for locating an object in an image is shown. At Act 110, a plurality of regions are defined within the image, for example, as previously described concerning FIG. 3. In one embodiment, the regions are defined by a set of horizontal axes 28 and vertical axes 30. In a version of this embodiment, each of the horizontal axes 28 are equidistant from one another and each of the vertical axes 30 are also equidistant from one another such that each of the regions 32 are the same size.

At Act 120, a metric is associated with a plurality of the regions 32, e.g., either all of the regions 32 in the image or some portion thereof. According to one embodiment, at Act 120, a vote accumulator array 34 is associated with a plurality of the regions and an element 36 of the vote accumulator array 34 is associated with each of the plurality of regions. For example, the region 32 located at the upper righthand corner of the image 20 may correspond to the element 36 located at the upper righthand corner of the vote accumulator array 34. For each of the regions 32 of the image 20, a similar one-to-one correspondence may be established between the region and a corresponding element of the vote accumulator array 34. In a version of this embodiment, the element 36 of the vote accumulator array is a bin. Thus, according to one embodiment, the metric is a vote total established by the vote accumulator array 34 for each of a plurality of regions.

The metric may be established in a variety of ways so long as the metric can be used to determine the likelihood that the object 22 is located in one region 36 when compared to the likelihood that the object is located in other regions 36 of the image 20.

At Act 130, the image is converted to a binary image, that is, the image is binarized. In one embodiment, the image is converted to a binary image using an adaptive threshold technique. As a result, in one embodiment, the remaining image processing of the process 100 is performed on the binary image. In an alternative embodiment, however, object localization is performed using the original image (e.g., the grayscale image) instead of a binarized version of the original image.

It will be recognized by those of ordinary skill in the art that the order of Acts 110, 120, 130 may vary. For example, the image 20 may be binarized according to Act 130 prior to the regions 32 being defined in the image 20 (i.e., Act 110) and the metric being associated with the regions (i.e., Act 120).

At Act 140, at least one characteristic of an object is identified. The characteristic may be a characteristic with which one or more of the pixel runs in the binarized image are consistent. That is, in one embodiment, the characteristic of the object is defined at a pixel level such that pixel runs that correspond to it may be used to identify the object in a binary image. For example, the run length of a pixel run may be consistent with the run length characteristic of the object. Further, the run lengths of consecutive pixel runs (i.e., consecutive foreground run lengths or consecutive background run lengths) may be consistent with the run length characteristic of consecutive pixel runs in the binary image of the object. In addition, the distance between two consecutive foreground or background pixel runs may be consistent with the distance between two consecutive pixel runs in the binary image of the object.

According to one embodiment, a consecutive pixel run is a pixel run that appears in the same row as the pixel run that is selected for processing (i.e., the selected pixel run) where the consecutive pixel run is either the immediately preceding pixel run or the immediately following pixel run that includes pixels with the same binary value as the selected pixel run. In one embodiment, a pixel run precedes another pixel run in a row when lowest indexed pixel in the run has a lower index number than the lowest indexed pixel in the pixel run that it precedes. Similarly, in this embodiment, a pixel run follows another pixel run in a row where the pixel with the lowest index number in the run is greater than the pixel with the lowest index number in the pixel run that it follows.

Further, pixel runs may be processed in sets of two or more pixel runs. In a version of this embodiment, where the pixel run selected for processing includes a set of two or more pixel runs, the existence of consecutive pixel runs is determined relative to the pixel with the lowest index number in the set of pixel runs.

The characteristic need not include pixel runs in the same row of the binarized-region (e.g., the region 38). As one example, the run length of two pixel runs located adjacent in different rows of the region 38 may be consistent with the run length of two pixel runs located adjacent in different rows that is characteristic of the binarized object.

At Act 150, the pixel runs having a selected binary value are located in the binarized image, for example, all the foreground pixel runs. The binarized image can be run length encoded by storing each identified pixel run, the position of the first pixel run, and the run length.

Referring now to FIG. 6, the results of the identification of pixel runs in the region 38 is shown. In this example, foreground pixel runs 46 were located in Act 150. Each of the foreground pixel runs 46 is shown as a shaded area outlined by a heavy black line. A single background pixel run 48 is also identified for reference. Additional background pixel runs exist in some of the unshaded areas of FIG. 6. For the purpose of describing the acts of the process 100, it is assumed that foreground pixel runs were identified in the binarized image at Act 150.

In general, at Act 160, the metric for the region where the pixel run is located is adjusted provided that the pixel run is consistent with one or more characteristics of the object. In addition, in some embodiments, the metric has a null value unless one or more pixel runs correspond to a characteristic of the object. In these embodiments, the metric is also initialized at Act 160 when such a pixel run is identified. Thus, in the embodiment illustrated in FIG. 1, Act 160 includes Act 160a and Act 160b where, at Act 160a, a determination is made whether the pixel run is consistent with at least one characteristic of the object. The characteristic may have, for example, been previously established at Act 140. In this embodiment, at Act 160b, the metric is adjusted for the region where the pixel run is located when the pixel run is consistent with the at least one characteristic. As mentioned previously, pixel runs may be processed in sets of two or more pixel runs with the same binary value. Thus, in some embodiments, for example, two consecutive foreground pixel runs separated by a background pixel run may be evaluated together to determine whether the set of pixel runs is consistent with at least one characteristic of the object.

According to one embodiment where a vote accumulator array is used, a pixel run does not meet the criteria to "vote" unless it does correspond to at least one characteristic of the object. Therefore, the pixel run is first evaluated to determine if it includes one or more of the features of a pixel run that do correspond to the at least one characteristic of the object. If the pixel run does not include such features, it does not contribute to the vote, i.e., it does not add or subtract from the vote total of the region where it is located.

If the pixel run does include the feature or features corresponding to the at is least one characteristic of the object, the pixel run votes, i.e., contributes to the vote total for the region 32 where the pixel run is located. In one embodiment, the pixel run contributes a weighted value to the vote total. In one embodiment, a vote number associated with the pixel run is initialized to a starting value when the pixel run does include one or more features that correspond to the at least one characteristic of the object. In some embodiments, the vote number is incremented based on the quantity of features that the pixel run includes, e.g., the degree to which the pixel run appears to correspond to the characteristics of the object. According to one embodiment, the vote number for the pixel run can be increased or decreased based upon the characteristics of adjacent pixel runs (if any exist). For example, the similarity of the run length of the pixel run being processed and the run lengths of one or more adjacent run lengths may be evaluated and the result used to adjust the vote number (including run lengths of pixels with a binary value that differs from the binary value of the selected pixel run). Other approaches may be used alone or in combination with this approach to adjust the vote number, for example, a comparison between the selected pixel run and a pixel run that is two lines above the selected pixel run.

In one embodiment, a value related to a contrast measurement is used to generate a weighted vote. For example, the image 20 may be referred to again and a difference in intensity in the image may be determined between the intensity of the middle pixel of the selected pixel run and the intensity of the middle pixel of a pixel run (e.g., a background pixel run) that separates the selected pixel run and a consecutive pixel run of the same binary value. Because the pixels in the binarized image only vary between the first binary value and the second binary value, however, the image 20 (e.g., the grayscale image) is referenced to establish the intensity levels of the pixels. That is, in one embodiment, an intensity level is determined for the location in the image 20 corresponding to the location of the middle pixel in the pixel run that is being processed. An intensity level is also determined for the location in the image 20 corresponding to the location of the pixel that is being compared to the pixel from the run that is being processed. In this embodiment, the weighted vote for the pixel run may be determined by finding the product of the vote number (e.g., which is determined by the pixel runs consistency with the at least one characteristic of the object) and the intensity difference.

Weighted-voting may increase the reliability of the scoring provided by the vote accumulator array 34 where, for example, the intensity difference adjusts the value of a vote of a region to account for the probability that the pixel run is actually part of an object and not the result of differences in illumination in the image 20. In particular, an object having a repetitive pattern (e.g., a barcode) is more likely to exhibit a large difference between foreground intensity and background intensity as compared to any repetitive changes in intensity exhibited by other objects. According to one embodiment, the weighted vote for a region is indicative of the degree to which a pixel run (or set of pixel runs) corresponds to a characteristic of the object.

Once the processing of the selected pixel run or selected set of pixel runs is complete, the pixel run "casts its vote" for the region in which it is located. That is, the metric associated with the element 36 in the vote accumulator array 34 corresponding to the region is adjusted. Because regions may include more than one pixel run or set of pixel runs, the above process may result in a plurality of pixel runs contributing to the cumulative score (e.g., the value of the vote) for a given region where each of the plurality of pixel runs adds a weighted value to the cumulative score.

When a pixel run is processed and the corresponding votes cast (if any), a determination is made at Act 170 whether each of the pixel runs included in the plurality of regions (e.g., in the image) has been evaluated. If not, the next pixel run is selected for processing at Act 175. The processing that occurs at Act 160 is then repeated for all pixel runs in the image or portion of the image that is being evaluated.

At Act 180, following the processing of the pixel runs in the image or the portion of the image being processed, the object is located by selecting a region based on the value of the metric (e.g., the vote total) associated with the region as a result of the processing of the pixel runs in the Act 160. Where the metric is a numerical value the selected region may be chosen as a result of having a high score or a low score (depending on the manner in which the metric is adjusted). The metric need not be a numerical value, however, and other approaches may be used to evaluate the metric and select the appropriate region. One alternate approach locates the object by locating a group of regions located in the same vicinity based on their scores. In one version, the regions have similar scores.

Where a vote accumulator array 34 is employed, the vote array is processed, and in one embodiment, the region associated with the element 36 having the highest accumulated vote is selected as the location of the object. In addition, because different sections of the object may be located in a plurality of regions, the highest accumulated vote may indicate the region where the center of the object is located.

Figure 11:
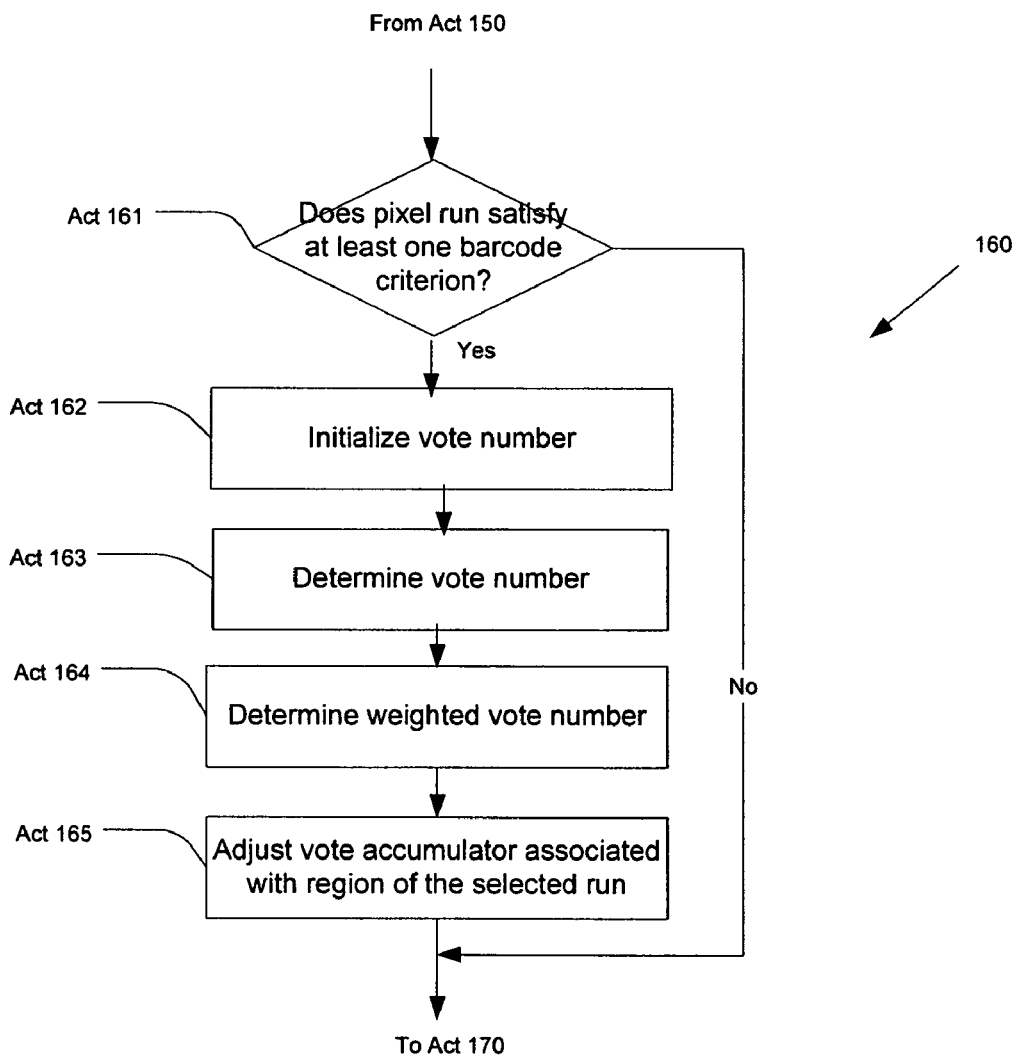
FIG. 11 illustrates a more detailed flow diagram of a portion of the process of FIG. 1 according to an embodiment of the invention.

Referring now to FIG. 11, the process included in the Act 160 is shown in greater detail for one embodiment where the process 100 is used to locate a barcode in an image. Embodiments of the process 100 may be used in wide variety of barcode-applications. For example, various embodiments of the process 100 may be employed to locate any type of barcode such as a 1-D barcode including linear barcodes such as interleaved 2 of 5 barcodes, code 128 barcodes, CODABAR barcodes, UPC linear barcodes, and the like. In addition, the barcode may be a stacked barcode, including a stacked barcode which may include a stacked 1-D barcode such as a Code 148 barcode. The barcode may also be a 2-D barcode which may also be referred to as a matrix barcode. Examples of 2-D barcodes that may be identified in embodiments of the invention include DataMatrix, QrCode, Maxi Code, Semacode, and the like.

The process illustrated in FIG. 11 is shown with reference to an embodiment where a vote accumulator is employed. Thus, in this embodiment, Acts 110 and 120 of FIG. 1 result in the identification of a plurality of regions in the image and the generation of a vote accumulator array 34 where each element 36 is associated with one region. In this embodiment, the metric associated with the region is a vote total.

As described previously, the image is binarized as a result of the Act 130. FIG. 7 illustrates the pixel runs located in one region 38 of the binarized image. As a result of the Acts 150, 170, 175, in one embodiment, each of the pixel runs are processed in the image by selecting each, in turn, and proceeding in the order of increasing indices of the pixel runs. As also mentioned above, the selected pixel run may include a plurality of pixel runs (i.e., a set or group) that may be associated with one another. In addition, foreground pixel runs or background pixel runs can be identified and processed. Thus, a selected pixel run may include any of a single foreground pixel run, a single background pixel run, two or more consecutive foreground pixel runs, two or more consecutive background pixel runs, a foreground pixel run and an adjacent background pixel run, a series of foreground and background pixel runs, and adjacent pixel runs that are located in separate rows.

As described previously with reference to FIG. 5, the rows and columns of the binarized image are indexed such that each pixel can be identified by a location having a unique index number. As a result, each pixel run may also be identified uniquely based on, for example, the index number of the lowest indexed number in the run. Thus, as shown in FIG. 7, the region 38 includes a selected pixel run 50 that is the current pixel run being processed, a next indexed pixel run 52 that follows the selected pixel run 50, a first adjacent pixel run 56, and a second adjacent pixel run 58 where each of the pixel runs 50, 52, 56, 58 are foreground pixel runs. Also shown is a background pixel run 54 which is located in the same row as and between the selected pixel run 50 and the next indexed pixel run 52. The first adjacent pixel run 56 is located in the row above the selected pixel run 50 and the second adjacent pixel run 58 is located in the row below the selected pixel run. Other methods of indexing may be employed in various embodiments.

At Act 140, at least one characteristic, is identified for the object and features of pixel runs corresponding to the at least one characteristic are established. In various embodiments, Act 140 may occur at any time in the process 100 before the Act 160. In addition, the act of establishing the features of the pixel runs corresponding to the at least one characteristic may occur in an act that is separate from the act of identifying the characteristic.

According to the embodiment of FIG. 11, the selected feature or features are referred to as barcode criterion. For example, a characteristic of the barcode may be that each band or gap has a minimum width and a maximum width. From this information, a minimum run length and a maximum run length for pixel runs included in the barcode can be determined and these features of the pixel runs may be used to define the barcode criterion. Thus, a pixel run may have an acceptable run length for a pixel run in an image of a barcode when the pixel run length falls within the range of acceptable run lengths for a barcode run, $[L_{barcode\_min}, L_{barcode\_max}]$.

According to one embodiment, the barcode criterion may include any one of the following or any combination of the following and additional criterion:

a. The selected foreground run 50 has an acceptable run length for a barcode run;

b. The next indexed foreground run 52 is located at a location beginning with a higher index on the same row as the selected foreground run 50 and the next indexed foreground run has an acceptable run length for a barcode run;

c. The background run 54 located between the selected foreground run 50 and the next indexed foreground run 52 has an acceptable run length for a barcode run; and d. At least one of the foreground run 56 located in the preceding row (i.e., the row with the next lower index number) adjacent the selected foreground run 50 or the foreground run 58 located in the following row adjacent the selected foreground run 50 has a run length similar to that of the selected foreground run 50, e.g., the difference between the run lengths is smaller than a predefined threshold.

For purposes of this description, the effect of the selected pixel run 50 on the vote total associated with the region 38 is described, i.e., the degree to which the pixel run weights the vote total. At Act 161, a determination is made whether the selected pixel run meets any of the barcode criterion, for example, the barcode criterion listed as a.-d. above. If not, the selected pixel run 50 does not effect the vote total of the region 38. Instead, the processing continues with the selection of the next indexed pixel run according to Act 170 and Act 175. In this example, the processing would continue with the pixel run 52.

Provided that the selected pixel run 50 does meet the barcode criterion, the contribution of the selected pixel run 50 to the vote total is determined. At Act 162, a vote number is initialized. At Act 163, the vote number is determined and at Act 164 the weighted vote number is determined. According to one embodiment, the vote number is initialized to the value "2" at Act 162. In this embodiment, the vote number and therefore the weighted vote number are the result of evaluating the selected pixel run 50 in view of the adjacent pixel runs 56, 58. In a version of this, embodiment, the vote number and weighted vote number are also the result of evaluating the selected pixel run 50 in view of a pixel run 54 (e.g., a background pixel run) located between the selected pixel run 50 and next indexed pixel run 52.

More specifically, in one embodiment, the vote number contributed by the selected pixel run 50 is adjusted as follows:

The first adjacent pixel run 56 (if any adjacent pixel runs exist) is considered. In one embodiment, the vote number is incremented by 1 if the run length of the first adjacent pixel run 56 is similar to that of the selected pixel run 50; otherwise, the vote number is decremented by 1. In another embodiment, there is no adjustment to the vote number when the run length of the first adjacent pixel run 56 is not similar to the run length of the selected pixel run 50. In one embodiment a first run length is similar to a second run length when the first run length includes the same quantity of pixels as the second run length, i.e., the run lengths of the two pixel runs are identical. In a further embodiment, a first run length is similar to a second run length when the quantity of pixels in the second pixel run equals the quantity of pixels in the first pixel run plus or minus a pre-defined quantity of pixels, i.e., the quantity of pixels in the second pixel run falls within an acceptance range. In one embodiment, where more than one adjacent pixel run occur in a single row adjacent the selected pixel run 50, the pixel run that is adjacent the middle pixel of the selected pixel run is employed to determine what, if any, adjustment is made to the vote number of the selected pixel run 50.

Similarly, in one embodiment, the second adjacent pixel run 58 is also considered and if the run length of the second adjacent pixel run 58 is similar to that of the selected pixel run 50, the vote number is incremented by 1; otherwise, the vote number is decremented by 1. As mentioned above, in one embodiment, there is no adjustment to the vote number when the run length of the second adjacent pixel run 58 is not similar to the run length of the selected pixel run 50.

In yet another embodiment, the run lengths of the first adjacent pixel run 56 and the second adjacent pixel run 58 are considered together and the vote number is incremented when both the first adjacent pixel run 56 and the second adjacent pixel run 58 have run lengths that are similar to the run length of the selected pixel run 50; otherwise, the vote number is not changed.

According to one embodiment, the vote number is further adjusted with reference to the grayscale image. For example, the difference in intensity between the middle pixel of the selected pixel run 50 and the middle pixel of the pixel run 54 located between the selected pixel run 50 and the next indexed pixel run 52 is determined. As previously mentioned, because the pixels can only have one of two values the intensity of the image 20 is referred to and it is actually the intensity of the two locations in the image 20 corresponding to the location of the two middle pixels that are compared.

The weighted vote number is determined as the product of the vote number and the intensity difference.

In some embodiments, other vote weighting schemes may be employed. In addition, other sets of the above steps alone or in combination may be employed in the process 100 and Act 160.

At Act 165, according to one embodiment, the weighted vote is cast for the element (e.g., the element 36) in the vote accumulator array 34 that is associated with the region 38. In this embodiment, following the completion of the Act 165, the Act 170 is performed to determine whether each pixel run in the binarized image has been processed. If not, at Act 175, the next indexed pixel run is processed beginning with the Act 161. In the preceding example, the next indexed pixel run 52 is processed. Assuming that the next indexed pixel 52 also meets the barcode criterion, a weighted vote will be determined for it and the element associated with the region 38 will be further adjusted to include the weighted vote resulting from the processing of the next indexed pixel 52. For example, the contribution of the next indexed pixel run 52 may simply be added to the vote total of the element 36 associated with the region 38.

The Act 180 occurs once all of the pixel runs in the image or selected region of the image have been processed. In this embodiment, at Act 180, the vote array is processed and the object (or, for example, a central region of the object) is located by selecting the region or regions 32 associated with the element 36 of the vote accumulator array 34 with the highest vote total. Because different portions of an object may appear in separate regions of the image, in some embodiments, the selected region may provide an approximate position of the barcode in the image. The approximate position can then be used as a starting point of an additional localization method.

Figure 8:
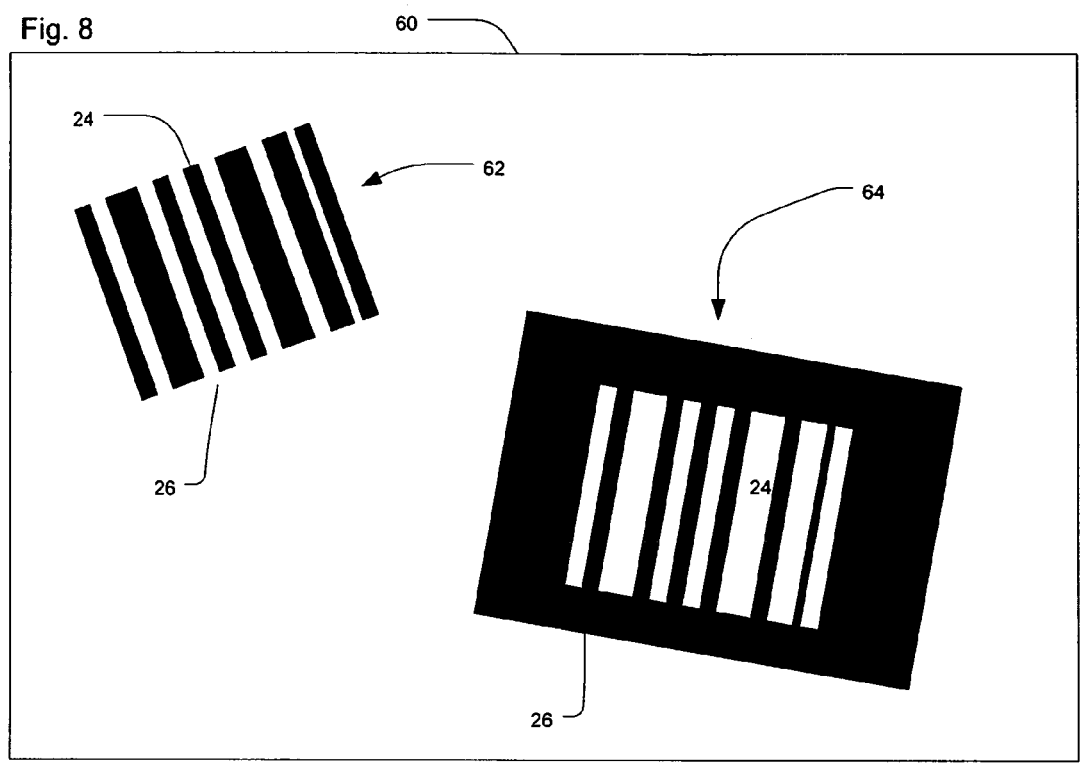
FIG. 8 illustrates two objects that can be located in an image according to an embodiment of the invention.

Referring now to FIG. 8, two styles of 1-D barcodes are illustrated in a single image 60. The barcode 62 is a "black-on-white" barcode. That is, the bars 24 are darker than the background and the gaps 26 are the spaces in between the bars 24 that are provided by the background. The barcode 64 is a "white-on-black" barcode. That is, the bars 24 are lighter than the background and the gaps 26 are the spaces in between the bars which are provided by the dark background. In one embodiment, the run lengths of both foreground pixel runs and background pixel runs may be determined. In a version of this embodiment, either foreground pixel runs or background pixel runs may be processed to determine whether they include features that correspond to characteristics of the barcode. As a result, embodiments of the invention may be employed to locate a "black-on-white" barcode and a "white-on-black" barcode in a single image. In addition, the barcodes can be located without any prior knowledge of their foreground color because it is not necessary, in one embodiment, to distinguish between bars and gaps. Instead, pixel runs that correspond to various features of the object without the need to determine whether the selected pixel run is a bar or a gap. For example, the process may detect the presence and accumulation of "run triplets" such as the appearance of a "foreground-background-foreground" in a region. That is, the appearance of three adjacent pixel runs generally corresponds to a characteristic of the barcode when the middle pixel run of the "triplet" has a different binary value than the preceding and subsequent pixel runs.

In each of the embodiments described herein, a user can establish one or more parameters that are employed in the process 100. The parameters may be associated with a single barcode type or a plurality of barcode types. For example, when setting up a barcode reading application to locate and read barcodes in a series of images, the user can enter relevant settings in a "barcode context." In the barcode context, the user may select the type or types of barcodes to locate within the images from among a set of supported barcode-types. For each selected barcode-type, the user can specify the number of such barcodes to locate and read in the images.

As mentioned above, various barcode styles and types may be processed according to the process shown in FIGS. 1 and 11, including "Code128", "Ean12", "Codabar" and "Interleaved 2 of 5." Generally, whatever the barcode type, at a given size, a barcode has a nominal bar width, and all bars and gaps of the barcode have widths that are multiples of this nominal bar width. Various barcode-types differ from one another in the ratio of the maximum bar or gap width to the nominal bar width. For example, in the Code128 barcode, bar and gap widths can be 1, 2, 3 or 4 times the nominal bar width. In the "Interleaved 2 of 5" barcode, bar and gap widths can be 1, 2, or 3 times the nominal bar width. Thus, each barcode-type ("type") has an associated maximum to nominal width ratio, which may be denoted $r_{MAX\_TO\_NOM}(type)$.

As a result of these known barcode characteristics, for each selected barcode-type, the user can specify a minimum and maximum size of the barcode in the image in terms of nominal bar widths. The user may specify a minimum nominal bar width $w_{NOM\_MIN}(type)$ and a maximum nominal bar width $w_{NOM\_MAX}(type)$. The user can also leave either or both of these at a default setting.

According to one embodiment, if a minimum nominal bar width $w_{NOM\_MIN}(type)$ is available for every one of the selected barcode-types (i.e., none were left at the default setting), the minimum barcode run length $L_{barcode\_min}$ is set to the smallest minimum nominal bar width $W_{NOM\_MIN}(type)$ among the selected barcode types.

$$L_{barcode\_min} = \min_{\forall\ selectedtypes} \{w_{NOM\_MIN}(type)\} \qquad \text{Eq. 1}$$

According to another embodiment, if any one of the minimum nominal bar widths $w_{NOM\_MIN}(type)$ was left at the default setting, the minimum barcode run length $L_{barcode\_min}$ is set to a default value of one pixel. As a result, a barcode bar or gap in the image can be as narrow as a pixel.

$$L_{barcode\_min} = 1 \qquad \text{Eq. 2}$$

The features of pixel runs corresponding to any of these barcode characteristics may be used when evaluating pixel runs at Act 160, and in particular, at Act 161.

In one embodiment, several elements are taken into account to determine the maximum barcode run length $L_{barcode\_max}$ that corresponds to a characteristic of the barcode-types that may appear in the image. For example, the maximum nominal bar width specified by the user for each selected barcode-type may be considered along with the maximum to nominal width ratio for each selected barcode-type and the rotation of the barcode in the image. Corresponding pixel run lengths may be based on these characteristics.

Where barcodes are processed in a fixed orientation, that is, the barcodes are not rotated, in one embodiment, the maximum barcode run length $L_{barcode\_max}$ is set to the largest maximum nominal bar width $w_{NOM\_MAX}(type)$ among the maximum bar widths for the selected barcode-types multi-plied by the largest maximum to nominal width ratio $r_{MAX\_TO\_NOM}(type)$ among the selected barcode types.

$$L_{barcode\_max} = \max_{\forall\ selectedtypes}\{w_{NOM\_MAX}(type)\} \max_{\forall\ selectedtypes}\{r_{MAX\_TO\_NOM}(type)\} \qquad \text{Eq. 3}$$

The preceding assumes that a maximum nominal bar width $w_{NOM\_MAX}(type)$ is available for every one of the selected barcode-types.

According to one embodiment, if any one of the maximum nominal bar widths $w_{NOM\_MAX}(type)$ was left at the default setting, however, the maximum barcode run length $L_{barcode\_max}$ is set to a default value of 256 pixels multiplied by the largest maximum to nominal width ratio $r_{MAX\_TO\_NOM}(type)$ among the selected barcode-types.

$$L_{barcode\_max} = 256 \max_{\forall\ selectedtypes}\{r_{MAX\_TO\_NOM}(type)\} \qquad \text{Eq. 4}$$

In accordance with one embodiment, the process 100 may also be employed to locate barcodes in the image 20 where the barcode is rotated between −45 and 45 degrees from vertical relative to the y-axis of the image 20. In accordance with one embodiment, the process 100 may also be employed to locate barcodes in the image 20 where the barcode is rotated between −45 and 45 degrees from vertical relative to the y-axis of the image 20. For example, a 1-D barcode rotated 90 degrees from vertical may result in the bands 24 and gaps 26 being oriented horizontally in the image. As a result, in the binarized image, the pixel runs associated with the bands 24 will appear as a continuous pixel run in each row of each region where the band 24 is located. In other words, alternating pixel runs associated with the barcode may not be available. According to this embodiment, however, the pixel runs in the binarized image may still include features corresponding to at least one characteristic of the barcode provided that the barcode is not rotated more than 45 degree from vertical.

In one embodiment, the process 100 may also be employed to locate barcodes in the image 20 where the barcodes are rotated between 45 and 135 degrees from vertical. In a version of this embodiment, at least a part of the process 100 is repeated using a 90 degree rotated image as the input. As a result, according to one embodiment, barcodes (e.g., the barcode 22) having any rotation between 0 and 360 degrees may be located in the image 20.

In one embodiment, the process 100 as illustrated in FIGS. 1 and 11 is used to locate a barcode rotated between 45 and 135 degrees in the image 20 where in one version of the embodiment, the barcode includes vertical bands 24. In this embodiment, an additional act is performed following the Act 120 whereby the original image 20 is rotated by 90 degrees. As a result, the alternating foreground and background pixel runs in the 1-D barcode will be detectable and distinctive in the binarized image. The Acts 130, 150, 160, 170 and 180 of the process 100 remain unchanged. Then after Act 180, a further act of rotating the location of the region with the highest vote back by 90 degrees is performed to provide the position of the barcode in the original image. Other approaches may be used, for example, the rotation may be applied to the binarized version of the image 20.

In another embodiment, the process 100 is used to locate the barcode 22 in the image 20 where the barcode may be at any rotation. In this embodiment, the process 100 is performed on the original image 20 and on a version of the original image 20 rotated by 90 degrees, however, the Act 180 is modified such that the region is not selected until the voting is complete for both the vote accumulator array 34 established for the original image and the vote accumulator array established for the rotated image. In a version of this embodiment, after the process 100 is performed on the original image and on the rotated version of the original image, the region with the highest vote total is selected based on the results of both vote accumulator arrays. In one embodiment, if the highest vote total is for a region in the un-rotated set, the region represents the location of the barcode in the original image. If the highest vote is for a region in the rotated set, however, the region in the rotated set represents the location of the barcode in the rotated image. Thus, a further act of rotating the location of the region with the highest vote back by 90 degrees is performed to provide the position of the barcode in the original image.

Various embodiments including the ability to process barcodes oriented anywhere from 0 to 360 degrees may use either the x-axis, the y-axis or another fixed point of reference to determine the angle of rotation of the object within the image.

According to one embodiment, the process 100 includes the acts of establishing a plurality of barcode criterion for the object. Barcode criterion are selected from the plurality of barcode criterion. These selected barcode criterion are employed to evaluate a set of pixel runs. Sets of pixel runs satisfy the barcode criterion when the set of pixel runs are consistent with at least one characteristic of the object. The set of pixel runs contribute to the vote total of an element in a vote accumulator array when the set of pixel runs satisfy the selected barcode criterion.

Figure 12:
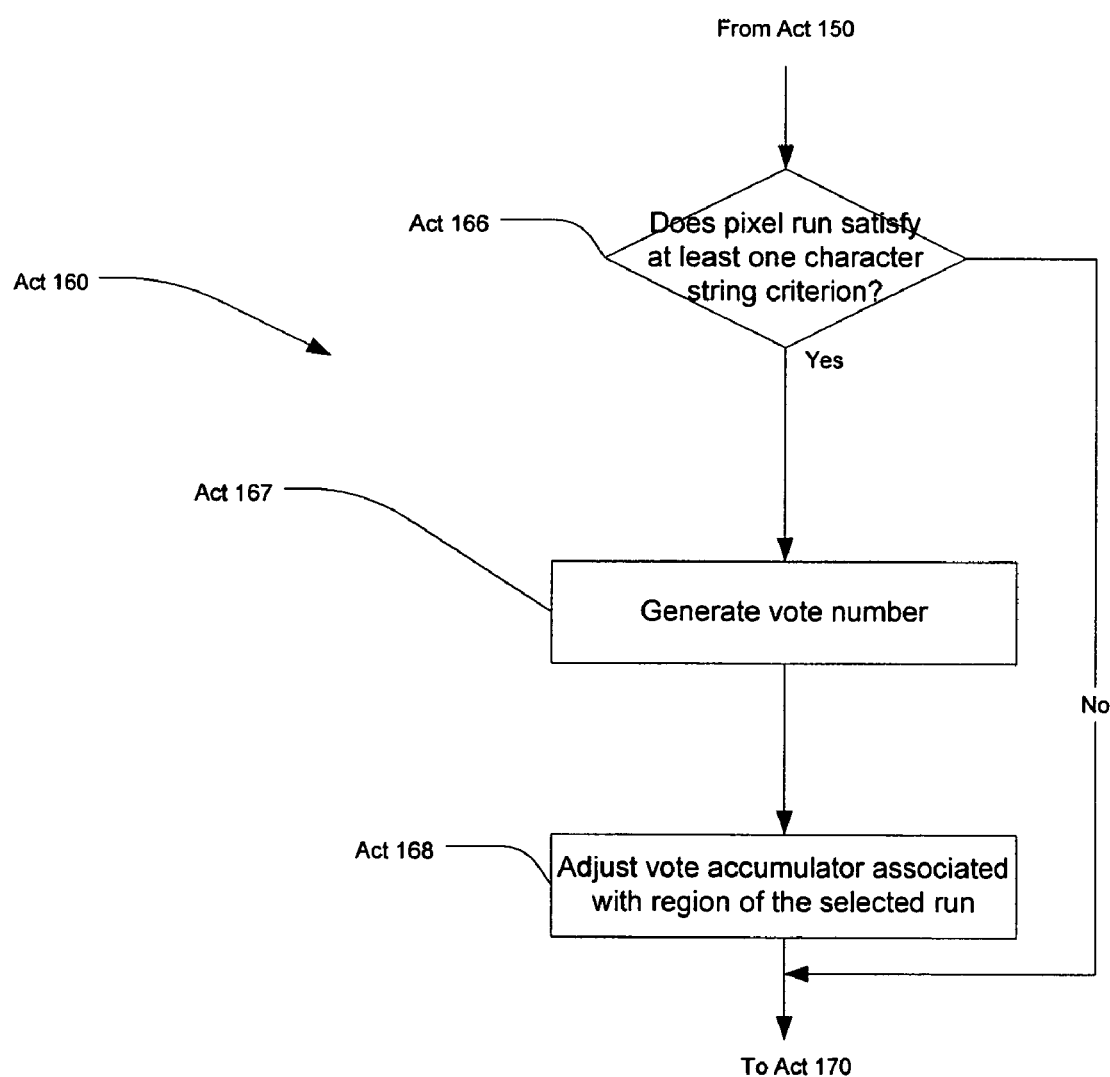
FIG. 12 illustrates a more detailed flow diagram of a portion of the process of FIG. 1 according to another embodiment of the invention.

Referring now to FIG. 12, the process included in the Act 160 is shown in greater detail for one embodiment where the process 100 is used to locate a character string in an image. For example, embodiments of the process 100 may be used in a wide variety of OCR applications. Further, various embodiments of the process 100 may be employed to locate any type of character string including character strings in a variety of sizes and fonts. In addition, embodiments of the invention may be employed to identify character strings even where the character strings are poorly defined, for example, where the characters in the string are merged due to poor binarization or poor illumination in the grayscale image.

One or more of these embodiments, generally identify a character string by resolving an alternating sequence of foreground pixel runs and background pixel runs in a binarized image where the alternating sequence includes features corresponding to at least one characteristic of the character string. In some embodiments, for example, the presence in a region (e.g., the region 38) of an image (e.g., the image 20) of a few foreground and background pixel runs may be a random event. However, the repeated presence of sequences of foreground pixel runs and background pixel runs corresponding to at least one characteristic of the character string may provide strong evidence that the character string is located in the region. The spaces between characters are sometimes referred to as "inter-character" spaces.

Figure 9:
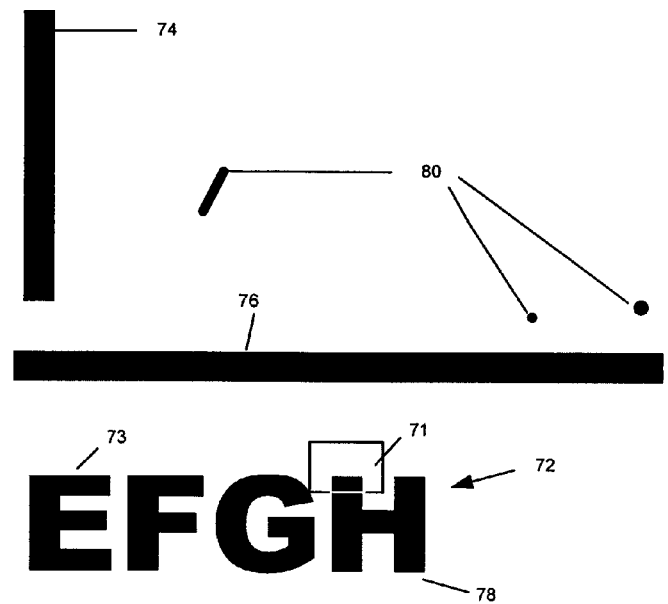
FIG. 9 illustrates a character string that can be located in an image according to an embodiment of the invention.
Figure 10:
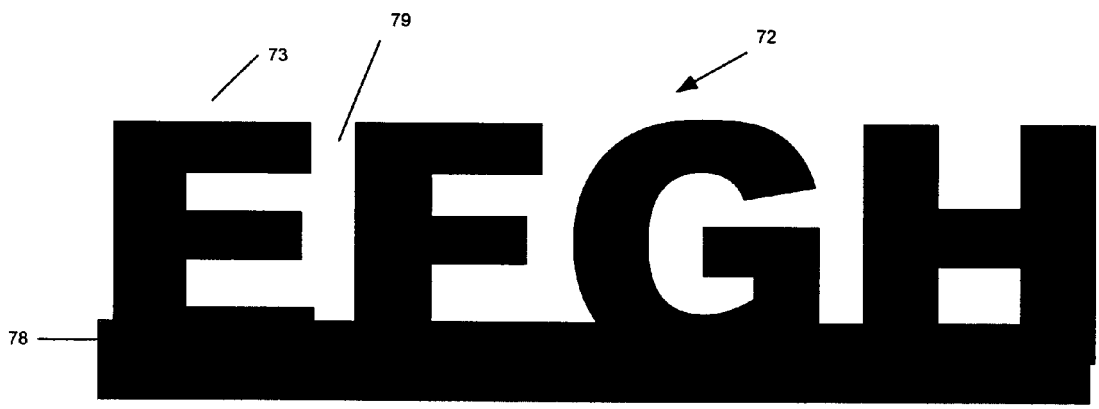
FIG. 10 illustrates an enlarged view of the character string of FIG. 9 according to an embodiment of the invention.

Referring to FIG. 9, an image 70 including a characteristic string 72 is shown. A character string may be any set of one or more characters 73 that appear in the image 70. The character 72 string may also include one or more spaces such as a space following a character or word in a sentence. The image 70 may also include blobs, for example, a vertical blob 74 and a horizontal blob 76, however, the blobs need not be linear. Generally, a blob originates as an area of constant contrast in the image 70. Such an area appears as contiguous region of pixels having the same binary value in the binarized version of the image 70. The effect of a blob 78 on the image of the character string 72 is also illustrated in FIG. 9. As can be seen there and in greater detail in FIG. 10, the blob eliminates the contrast that exists between adjacent characters and the space that is located adjacent to them. That is, the background and the foreground in a character string may merge and appear as a single foreground region. For example, in FIG. 10, the inter-character spacing 79 that appears between the characters "E" and "F" connects the foreground region of the lower portion of the character E with the lower portion of the foreground region of the character F. As a result, the binarized image will show a continuous horizontal pixel run in the region of the blob 78.

The process illustrated in FIG. 12 is shown with reference to an embodiment where a vote accumulator is employed. Thus, in this embodiment, Acts 110 and 120 of FIG. 1 result in the identification of a plurality of regions in the image and the generation of a vote accumulator array 34 where each element 36 is associated with one region as previously described with reference to FIGS. 3 and 4. In this embodiment, the metric associated with the region is a vote total.

Figure 13:
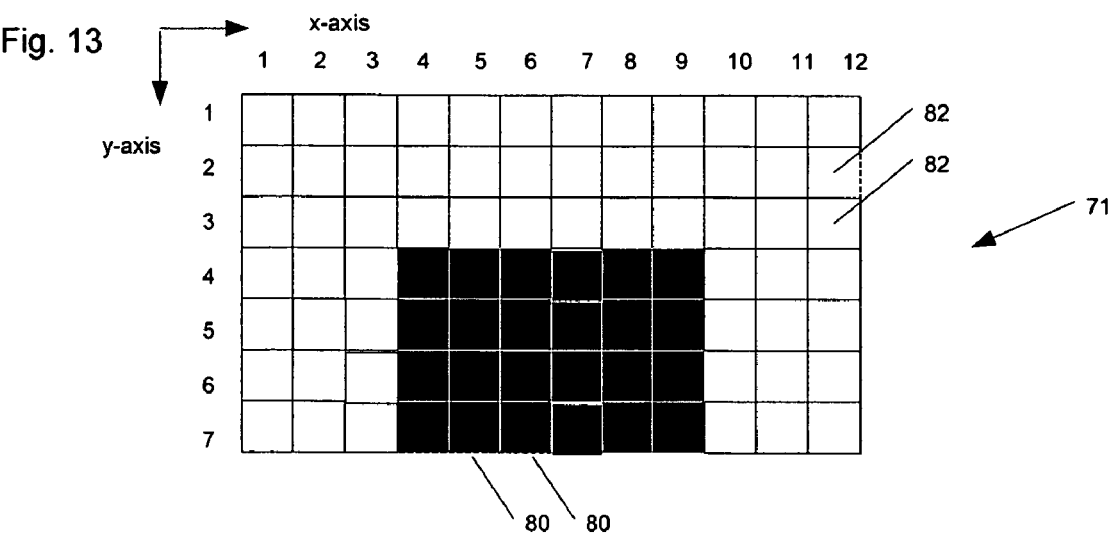
FIG. 13 illustrates pixels in a region of FIG. 9 in accordance with another embodiment of the invention.
Figure 14:
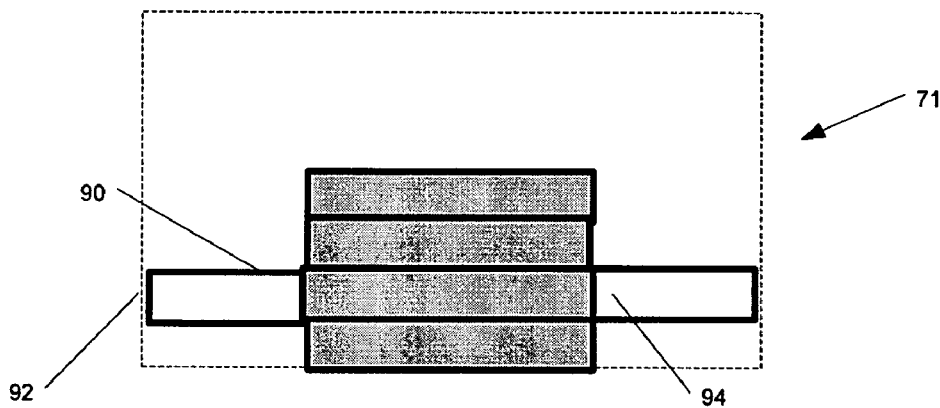
FIG. 14 illustrates pixel runs identified in the region shown in FIG. 13 to according to a further embodiment of the invention.

As described previously, the image is binarized as a result of the Act 130. A region 71 is identified in FIG. 9 and is referred to here for the purpose of describing the processing of one or more pixel runs. The region 71 includes a part of a character and part of the associated background including a part of the space between the character G and the character H. The space between characters is sometimes referred to as an inter-character space. FIG. 13 illustrates the foreground pixels 80 and the background pixels 82 located in the region 71 of the binarized image while FIG. 14 illustrates the pixel runs identified as a result of the process 100. Thus, the binarized version of the region 71 represents some portion of the space between characters (i.e., the pixels to the left of the group of foreground pixels in FIG. 13) and some portion of the space that appears within the character H (i.e., the pixels to the right of the group of foreground pixels). The background regions located within a character (e.g., between the parallel, vertical sections of the letter H) are sometimes referred to as an intra-character space. Thus, an "intra-string" background run may include both inter-character regions and intra-character regions that may appear within a character string.

As a result of the Acts 150, 170, 175, in one embodiment, each of the pixel runs are processed in the image by selecting each, in turn, and proceeding in the order of increasing indices of the pixel runs. As also mentioned above, the pixel run may include a plurality of selected pixel runs that may be associated with one another, i.e., a set of pixel runs. In addition, foreground pixel runs or background pixel runs can be identified and processed. Thus, a pixel run selected for processing may include any of a single foreground pixel run, a single background pixel run, two or more consecutive foreground pixel runs, two or more consecutive background pixel runs, a foreground pixel run and an adjacent a background pixel run, a series of foreground and background pixel runs, and adjacent pixel runs that are located in separate rows. It should also be noted that a complete foreground pixel run and a complete background pixel run may extend through a plurality of regions depending upon the width of the run.

As shown in FIG. 13, the rows and columns of the binarized image are indexed such that each pixel can be identified by a location with a unique coordinate. As a result, in FIG. 14, each pixel run may also be identified uniquely based on, for example, the coordinate of the pixel with the smallest x coordinate in the run. Thus, the region 71 includes a selected pixel run 90 that is the current pixel run being processed, a first background pixel run 92 and a second background pixel run 94 which are located in the same row as the selected pixel run 90. As mentioned above, the background pixel runs 92, 94 located in the regions 71 may be included in larger pixel runs that are wider than the region 71, i.e., the pixel runs 92, 94 may be part of separate larger pixel runs.

At Act 140, at least one characteristics is identified for the object and features of pixel runs corresponding to the at least one characteristic are established. According to the embodiment of FIG. 13, the features are referred to as character string criterion. For example, a characteristic of the character string may be that each character has a minimum width and a maximum width with an inter-character space on either side of the character. The inter-character space may also have a maximum width and a minimum width. From this information, a minimum run length and a maximum run length for both foreground and background pixel runs included in the character string can be determined and these features of the pixel runs may be used to define the character string criterion. Thus, a pixel run may have an acceptable run length for a pixel run in an image of the character string when the pixel run length falls within the range of run lengths corresponding to at least one characteristic of a character string, $[L_{char\_min}, L_{char\_max}]$ $[L_{min}, L_{max}]$.

According to one embodiment, values used in establishing the character string criterion may be generated as follows:

a. For an image with a known scale, the minimum run length for a character in the image (Lchar_min) is equal to the minimum character thickness in the font (minimum character's stroke width) multiplied by the scale of the image.

b. For the known scale, the maximum run length for a character in the image (Lchar_max) is equal to the maximum character width in the font multiplied by the scale of the image.

c. The minimum and maximum inter-character spacing can be determined based on the minimum and maximum run lengths corresponding to a characteristic of the character string as shown below, where the value 1.1 is a predetermined factor used to increase the range of tolerance for the background runs because the exact inter-character spacing may not be known in advance. The factor may be varied depending upon the application.
Lspace_min=Lchar_min/1.1
Lspace_max=Lchar_max*1.1

Thus, according to one embodiment, the character string criterion may include any of the following or any combination of the following and additional criteria:

The current foreground run should have a run length that is acceptable for a character. The run length should belong to a predetermined range $[L_{char\_min}, L_{char\_max}]$, which defines the minimum and maximum run length for a character.

There should be background runs on either side of the current foreground run. Furthermore, each of the background runs should have a run length that is acceptable for an intra-string background run. The run lengths should belong to a predetermined range $[L_{space\_min}, L_{space\_max}]$, which defines the minimum and maximum run length for an inter-character space.

As illustrated in FIGS. 1 and 12, the pixel runs are located at Act 150 and then processed at Act 160. According to one embodiment, the Act 160 includes the Acts 166, 167, 168. For purposes of this description, the effect of the selected pixel run 90 on the vote total or the region 71 is described. At Act 166, a determination is made whether the selected pixel run meets any of the character string criterion, for example, the character string criterion listed above. If not, the selected pixel run 90 does not effect the vote total of the region 71. Instead, the processing continues with the selection of the next indexed pixel run according to Act 170 and Act 175. In this example, the processing would continue with the pixel run 94.

Provided that the pixel run 90 does meet the character string criterion, the contribution of the selected pixel run 90 to the vote total is determined. At Act 162, a vote number is generated. According to one embodiment, a weighted vote number is determined using a weight value of one. According to another embodiment, varied weight numbers may be employed based on the evaluation of the pixel runs in the region as described with reference to FIG. 11. At Act 168, the vote is cast for the element (e.g., the element) in the vote accumulator array 34 that is associated with the region 71. In this embodiment, following the completion of the Act 168, the Act 170 is performed to determine whether each pixel run in the binarized image has been processed. If not, at Act 175, the next pixel run is processed beginning with the Act 166. In an alternate embodiment, a weighted vote similar to that described with reference to FIG. 11 is employed using the character string criterion. As described with reference to FIG. 11, a plurality of pixel runs may contribute to the vote total associated with the region.

Once all of the pixel runs in the image or selected region of the image have been processed Act 180 occurs. In this embodiment, at Act 180, the vote array is processed and the object (or, for example, a central region of the object) is located by selecting the region or regions (e.g., the regions 32) associated with the element (e.g., the element 36) of the vote accumulator array (e.g., the array 34) with the highest vote total. Here too, the selected region may provide an approximate position of the character string in the image which may be used as a starting point of an additional localization method.

Generally, the character strings that are being searched for and located include more than a single character. In some embodiments, therefore, the Act 160 includes a further act that combines the vote totals for a plurality of regions to increase the accuracy of the localization. According to one embodiment, the Act 180 employs an adjusted value for each element in the vote accumulator array. For example, the value of vote total determined for each element in the vote accumulator array may be replaced by the sum of the vote total for the element and the value of the vote total of each of the next three elements in the vote accumulator array. In a version of this embodiment, the next three elements are the three elements that have the next three highest index numbers in the x-axis, for example:

$$\text{Bin}[x] = \text{Bin}[X] + \text{Bin}[X+1] + \text{Bin}[X+2] + \text{Bin}[X+3] \qquad \text{Eq. 5}$$

That is, in one embodiment, vote totals are established in a first version of the vote accumulator array. Then a second version of the vote accumulator array is generated where each element in the array is adjusted according to Equation 5.

The vote values resulting from this post-processed vote accumulator array (i.e., the second version of the array) are employed at Act 180 to determine the location of the character string. In one embodiment, the element with the highest value in the second version of the vote accumulator array indicates that it includes the greatest quantity of consecutive characters that correspond to the at least one characteristic of the character string. According to one embodiment, the act of "post processing" described above is either performed as a part of the Act 180 or as a separate act that precedes the Act 180 in the process 100.

Further according to one embodiment, the size of the regions 32 (e.g., the region 71) is selected to ensure that at least one element 36 of the vote accumulator array 34 is completely included in a character. According to one embodiment, elements associated with regions that are located entirely within a character provide a high vote total. In one embodiment, the size of a region is determined by both the maximum character height and the maximum character width. Thus, according to some embodiments, the size of the region 32 in the direction of the x-axis is equal to or greater than the product of maximum character size of the font in the x-axis and the scale of the image. In a version of this embodiment, the size of the region in the x-axis is always greater than or equal to a constant determined by the maximum character size of the font in the x-axis and the scale of the image. In one embodiment, the constant has a value of 5.

Similarly, in one embodiment, the size of the region in the direction of the y-axis is equal to or greater than the product of one-half the minimum character size of the font in the y-axis and the scale of the image. In a version of this embodiment, the size of the region in the y-axis is always greater than or equal to a constant determined by one-half the minimum character size of the font in the y-axis and the scale of the image. In one embodiment, the constant has a value of 3.

Where the use of a single vote accumulator array 34 may result in a wide range of vote totals for the regions, the single array may be replaced by a plurality of vote arrays. Such an approach may prevent a "dilution" of the vote total across the array and the corresponding reduction in the relevance of the vote totals to the location of the object and is used when dealing with a large scale of vote totals.

As mentioned previously, the size of the regions (e.g., the regions 32) corresponding to the elements of the vote accumulator may be selected to increase the accuracy of the voting. Accordingly, in one embodiment, the size of each region is substantially one-half the size of the object. Where the object is a barcode, for example, each region may be half the size of the barcode that is being searched for. In one embodiment, where the object is a character string, the height of the region is substantially one-half the height of the characters and the width of the region is substantially one-half the width of the widest character of the font (e.g., a "W").

Embodiments of the invention may be employed in a variety of image processing applications including machine vision systems. For example, embodiments may be employed in any application where a camera is used to read a barcode or a label including text. Embodiments of the invention may be employed in license plate reading systems, packaging handling systems such as systems that handle medical packages and mail and parcel sorting systems. Other applications for embodiments of the invention include systems that read barcodes and/or labels in a manufacturing environment. In addition, embodiments of the invention may be employed to read any type of code symbology, for example, datamatrix, PDF417, Qr Code and the like. Various embodiments may also be employed in any other application where an object with a repetitive pattern must be located in an image.

In some embodiments, the repetitive pattern characteristic of the object appears in the binarized image of the object where it may be detected by evaluating features of pixel runs included in the image. In versions of these embodiments, the repetitive pattern includes a series of alternating foreground pixels runs and background pixel runs. The object may be located by identifying a region in the image where the foreground and background pixel runs are consistent with the characteristics of the object.

Any of the above-described embodiments, may be included in a computer system. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Such a computer system generally includes a processor connected to one or more memory devices, such as a disk drive memory, a RAM memory, or other device for storing data. The memory is typically used for storing programs and data during operation of the computer system. Software, including programming code that implements embodiments of the present invention, is generally stored on a computer readable and/or writeable nonvolatile recording medium and then copied into memory wherein it is then executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A non-transitory computer readable storage medium encoded with a program for execution on a processor, the program when executed on the processor performing a method for locating a barcode in an image, the barcode having at least one characteristic, the method comprising acts of:
   a. Defining a plurality of regions in the image;
   b. Associating a vote accumulator with each of the regions;
   c. Finding pixel runs in the image, wherein a pixel run includes a group of adjacent pixels having a like binary value that are arranged linearly in a first direction in the image, the pixel run bounded linearly in the first direction by at least one pixel having a binary value that differs from the like binary value;
   d. Identifying, in one of the plurality of regions, two consecutive pixel runs comprising a first pixel run of pixels in the first direction and having a first binary value and a second pixel run of pixels in the first direction and having the first binary value, the two consecutive pixel runs separated in the first direction by a third pixel run of pixels in the first direction and having a second binary value, wherein the first pixel run, the second pixel run and the third pixel run are in a line, wherein each of the first pixel run, the second pixel run and the third pixel run has a run length that is consistent with the at least one characteristic;
   e. Adjusting the vote accumulator associated with the region where the two consecutive pixel runs are identified; and
   f. Identifying from among the plurality of regions, a region where the barcode is located based on the vote accumulators.

2. The non-transitory computer readable storage medium of claim 1, wherein the method further comprises acts of:
   locating at least one pixel run adjacent to one of the first pixel run and the second pixel run; and determining whether the at least one adjacent pixel run includes a run length that is similar to the run length of the one of the first pixel run and the second pixel run to which it is adjacent.

3. The non-transitory computer readable storage medium of claim 2, further comprising locating the at least one adjacent pixel run in one of a preceding row and a subsequent row.

4. The non-transitory computer readable storage medium of claim 1, wherein the act of adjusting the vote accumulator further comprises acts of:
determining a vote weight based at least in part on the identification of the two consecutive pixel runs; and
adjusting the vote accumulator by an amount determined by the vote weight.

5. The non-transitory computer readable storage medium of claim 4, wherein the method further comprises acts of:
determining a degree to which the two consecutive pixel runs identified in one of the plurality of regions are consistent with the at least one characteristic of the barcode; and
determining the vote weight based, at least in part, on the degree.

6. The non-transitory computer readable storage medium of claim 4, wherein the method further comprises acts of:
determining a contrast value of at least one of the first pixel run, the second pixel run and the third pixel run; and
determining the vote weight based, at least in part, on the contrast value.

7. The non-transitory computer readable storage medium of claim 1, wherein the method further comprises an act of determining if the run lengths of each of the first pixel run, the second pixel run and the third pixel run belong to a predetermined range of barcode run lengths.

8. The non-transitory computer readable storage medium of claim 1, wherein the at least one characteristic is a barcode criterion.

9. A non-transitory computer readable storage medium encoded with a program for execution on a processor, the program when executed on the processor performing a method for locating a character string in an image, the character string appearing in the image in a human-readable form, the character string having at least one characteristic, the method comprising:
a) Defining a plurality of regions in the image;
b) Associating a vote accumulator with each of the regions;
c) Finding pixel runs in the image, wherein a pixel run includes a group of adjacent pixels having a like binary value arranged linearly in a first direction in the image, the pixel run bounded linearly in the first direction by at least one pixel having a binary value that differs from the like binary value;
d) Identifying, in one of the plurality of regions, two consecutive pixel runs comprising a first pixel run of pixels in the first direction and having a first binary value and a second pixel run of pixels in the first direction and having the first binary value, the two consecutive pixel runs separated in the first direction by a third pixel run of pixels in the first direction and having a second binary value, wherein the first pixel run, the second pixel run and the third pixel run are in a line, wherein each of the first pixel run, the second pixel run and the third pixel run has a run length that is consistent with the at least one characteristic of the character string;
e) Adjusting the vote accumulator associated with the region where the two consecutive pixel runs are identified; and
f) Identifying from among the plurality of regions, a region where the character string is located based on the vote accumulators,
wherein the character string includes at least one character of an alphabet.

10. The non-transitory computer readable storage medium of claim 9, wherein the at least one characteristic includes a characteristic associated with the width of an inter-character space.

11. The non-transitory computer readable storage medium of claim 9, wherein the at least one characteristic includes a characteristic associated with a character width.

12. The non-transitory computer readable storage medium of claim 9, wherein the act of adjusting the vote accumulator further comprises acts of:
determining a vote weight based at least in part on the identification of the two consecutive pixel runs; and
adjusting the vote accumulator by an amount determined by the vote weight.

13. The non-transitory computer readable storage medium of claim 12, wherein the method further comprises acts of:
determining a degree to which the two consecutive pixel runs identified in one of the plurality of regions is consistent with the at least one characteristic of the character string; and
determining the vote weight based, at least in part, on the degree.

14. The non-transitory computer readable storage medium of claim 12, wherein the method further comprises acts of:
determining a contrast value of at least one of the first pixel run, the second pixel run and the third pixel run; and
determining the vote weight based, at least in part, on the contrast value.

15. The non-transitory computer readable storage medium of claim 9, wherein the at least one characteristic includes a range of character widths, and wherein the act of identifying two consecutive pixel runs further comprises an act of determining whether each of the first pixel run and the second pixel run has a run length consistent with the range of character widths.

16. The non-transitory computer readable storage medium of claim 9, wherein the at least one characteristic is a character string criterion.

17. A non-transitory computer readable storage medium encoded with a program for execution on a processor, the program when executed on the processor performing a method for locating an object in an image, the object exhibiting in at least one direction foreground pixel runs and background pixel runs consistent with at least one characteristic of the object, the method comprising acts of:
a. Defining a plurality of regions in the image;
b. Associating a metric with each of the regions;
c. Finding pixel runs in the image, wherein a pixel run includes a group of adjacent pixels having a like binary value arranged in a first direction in the image, the pixel run bounded in the first direction by at least one pixel having a binary value that differs from the like binary value;
d. Identifying, in one of the plurality of regions, two consecutive pixel runs comprising a first pixel run of pixels in the first direction and having a first binary value and a second pixel run of pixels in the first direction and having the first binary value, the two consecutive pixel runs separated in the first direction by a third pixel run of pixels in the first direction and having a second binary value, wherein the first pixel run, the second pixel run and the third pixel run are in a line, wherein each of the first pixel run, the second pixel run and the third pixel run has a run length that is consistent with the at least one characteristic of the object;

e. Adjusting the metric associated with the region where the two consecutive pixel runs are identified; and f. Identifying, from among the plurality of regions, a region where the object is located based on the metrics.

18. The non-transitory computer readable storage medium of claim 15, wherein the at least one characteristic includes a range of widths for inter-character spaces, and wherein the act of identifying the two consecutive pixel runs further comprises an act of determining whether the third pixel run has a run length consistent with the range of widths for inter-character spaces.

19. The non-transitory computer readable storage medium of claim 1, wherein the run length of the first pixel run is consistent with a first characteristic of the barcode, and wherein the run length of the second pixel run is consistent with a second characteristic of the barcode which is different than the first characteristic.

* * * * *